United States Patent [19]
Jacobson et al.

[11] 3,886,803
[45] June 3, 1975

[54] FLUID BEARING GYROSCOPE

[75] Inventors: Peter E. Jacobson; Arthur W. Lane; Paul E. Ashley, all of Phoenix, Ariz.

[73] Assignee: Sperry Rand Corporation, New York, N.Y.

[22] Filed: Apr. 6, 1973

[21] Appl. No.: 348,546

[52] U.S. Cl.............. 74/5.6 D; 74/5.7; 308/DIG. 1; 310/216
[51] Int. Cl............................................ G01c 19/18
[58] Field of Search .......... 308/DIG. 1, 9; 74/5.6 D, 74/5.7, 5 R; 310/216, 259, 254

[56] References Cited
UNITED STATES PATENTS

| | | | |
|---|---|---|---|
| 2,487,846 | 11/1949 | Boelsums........................ | 310/259 X |
| 3,490,297 | 1/1970 | Brodersen........................ | 74/5.6 D |
| 3,557,629 | 1/1971 | Quermann........................ | 74/5.6 D |
| 3,680,671 | 8/1972 | Hendershot et al. ........... | 310/216 X |
| 3,722,297 | 3/1973 | Duncan et al. .................. | 74/5.7 X |

*Primary Examiner*—Manuel A. Antonakas
*Attorney, Agent, or Firm*—Howard P. Terry; Thomas J. Scott

[57] ABSTRACT

A gyroscopic device for sensing angular rates about a pair of orthogonal axes and sensing linear acceleration with respect to the rotor spin axis in which the gyro rotor includes in operation a free floating cylindrical rotor member shaped like a thick disc having flat end portions which constitute axial air-bearing surfaces and a cylindrical portion between said flat end portions which constitutes a journal or radial air bearing surface. Electrically, the rotor functions simultaneously as the armature of an electrical spin motor, the armature of a plurality of capacitive electrical pick-offs, and the armature of an electrical torquer. A sealed cavity for the rotor is formed by an air bearing journal stator ring having pressure profile forming grooves spatially stabilizing the rotor radially and axial air bearing surfaces at each end of the cavity also having pressure profile forming grooves for spatially stabilizing the rotor axially. The motor stator winding assembly is axially displaced from the rotor along the longitudinal axis of the device thereby isolating any contaminants produced by the stator coil from the sealed cavity and rotor area. A plurality of elongated laminations disposed between the journal stator ring and the motor stator coil magnetically couple the driving energy produced by the stator assembly to the rotor. The capacitive pick-off circuit elements for detecting the turn rates are located closely adjacent the capacitive pick-off elements and in the space defined by the axially separated motor winding assembly and rotor thereby minimizing stray field coupling.

20 Claims, 4 Drawing Figures

ROTOR ROTATION

FLUID BEARING GYROSCOPE

BACKGROUND OF THE INVENTION

1. Field of the Invention

The present invention relates to gyroscopic apparatus and particularly to gyroscopic angular rate sensors of the free rotor type employed for detecting and measuring angular rates of vehicular movement with respect to a single axis, or a pair of mutually perpendicular axes and, additionally if desired, for measuring linear accelerations along the rotor spin axis.

More particularly, the present invention relates to a rate sensor including a single rotating element which is rotated about its spin axis at a high rate of speed and is wholly hydrodynamically supported within a sealed cavity.

2. Description of the Prior Art

The present invention is an improvement of the invention disclosed in U.S. Pat. No. 3,722,297 entitled "Fluid Bearing Gyroscope," issued to Damon H. Duncan and Peter E. Jacobson and assigned to the same assignee as the present invention. As disclosed therein, the spin motor was conventional in that the laminated stator core and the coil were perimetrically disposed about the disc-shaped rotor with the inner circular surface of the laminated core portion of the stator defining the cylindrical surface of the cavity side wall. Further, the laminated core and the coil were exposed to the same ambient fluid as the spinning disc-shaped rotor.

As is well known in the art of motors and generators, motor coils produce contaminants through outgassing which contribute a substantial amount of pollution to the interior spaces of a motor. Thus, in the configuration of the fluid bearing gyroscope disclosed in the above referenced application, contaminants produced by outgassing in the motor coil could quite readily mix with the surrounding fluid and degrade the viscosity of the fluid and operating clearances and thereby adversely affecting the performance of the hydrodynamically suspended rotor.

Further, changing the contaminated fluid or removing the stator, which is the least reliable of the elements associated with the internal cavity, requires breaking the seal of the cavity and disrupting the alignment of the bearing surfaces.

Although it is appreciated that a gyroscopic rotor supported on a conventional gas bearing offers operational advantages of life and reliability over and above a gyroscopic rotor supported on conventional ball bearings, it also includes additional modes of failure. For example, the prior art design does not readily accommodate synchronous speed touch-downs due to inadvertent overrates and high speed journal contacts during coast-down. Therefore, damage could be imparted to the gyroscopic rotor due to scoring and even welding of the rotor to one of the thrust bearing surfaces thereby causing complete failure of the sensor.

SUMMARY OF THE INVENTION

The present invention is a gyroscopic rate sensor having a unique configuration. One of the unique characteristics of the sensor is its rotor drive motor design wherein the stator of the motor is spatially and physically displaced from the rotor along the longitudinal axis of the sensor. The rotating flux produced by the stator windings is coupled to the rotor through a plurality of elongated laminated pole pieces extending longitudinally between the stator and the rotor. The rotor, which is disc-shaped as taught in the referenced co-pending application, is hydrodynamically suspended within a sealed internal cavity of the sensor and the supporting gas provides radial and axial support and also constitutes the reference spring restraint as well as the rotor damper. The rotor constitutes the armature of an electric torquer used for self test purposes and the armature of capacitive electrical pick-offs for providing angular rate and linear acceleration output signals. Isolating the stator from the sealed internal cavity prevents contaminants produced by the stator coil insulating and potting materials from polluting the fluid which hydrodynamically suspends the rotor within the cavity and allows the stator to be replaced without breaking the seal of the internal cavity or disturbing the alignment of the bearing surfaces.

In addition, rectifying electronic circuits are located closely adjacent the capacitive pick-offs between the motor stator and sensitive rotor thereby eliminating the requirement for shielding the capacitive pick-off signals. Further, corresponding trim capacitors are positioned proximate the electronic circuits thereby providing individual scale factor adjustment for each capacitive pick-off.

In this configuration the axial thrust bearing surfaces which form the ends of the sealed internal cavity are made from ceramic or other suitable material to reduce the probability of damage to the rotor during "landing and take-off" operations and possible scoring in case of overrates.

The connecting pins that couple input power to the unit and couple output signals from the unit comprise rods that extend into the unit and lie in the grooves formed between the elongated laminated motor core arms and serve to support electronic circuit boards through solder pads and ceramic ferrules. These rods may be soldered to the boards by applying heat to the pins external to the unit thereby simplifying the assembly procedure and reducing the cost of manufacture.

Pressure profile forming chevron grooving around the cylindrical inner surface of the internal cavity are designed to provide a dynamically stable rotor with improved null repeatability of the rate sensor from turn-on to turn-on.

This overall unique configuration also improves the diameter to length ratio of the overall unit so that the diameter of the rotor may be increased with only a nominal attendant increase in the overall diameter of the unit since the stator does not determine the rotor diameter.

The reduction in the number of functional parts (the rotor being the only moving part), as compared to more conventional rate and acceleration sensors, is directly reflected in improved reliability. Furthermore, the corresponding reduction in complexity improves the manufacturing yield and cost.

DESCRIPTION OF THE PREFERRED EMBODIMENT

Figure 1:
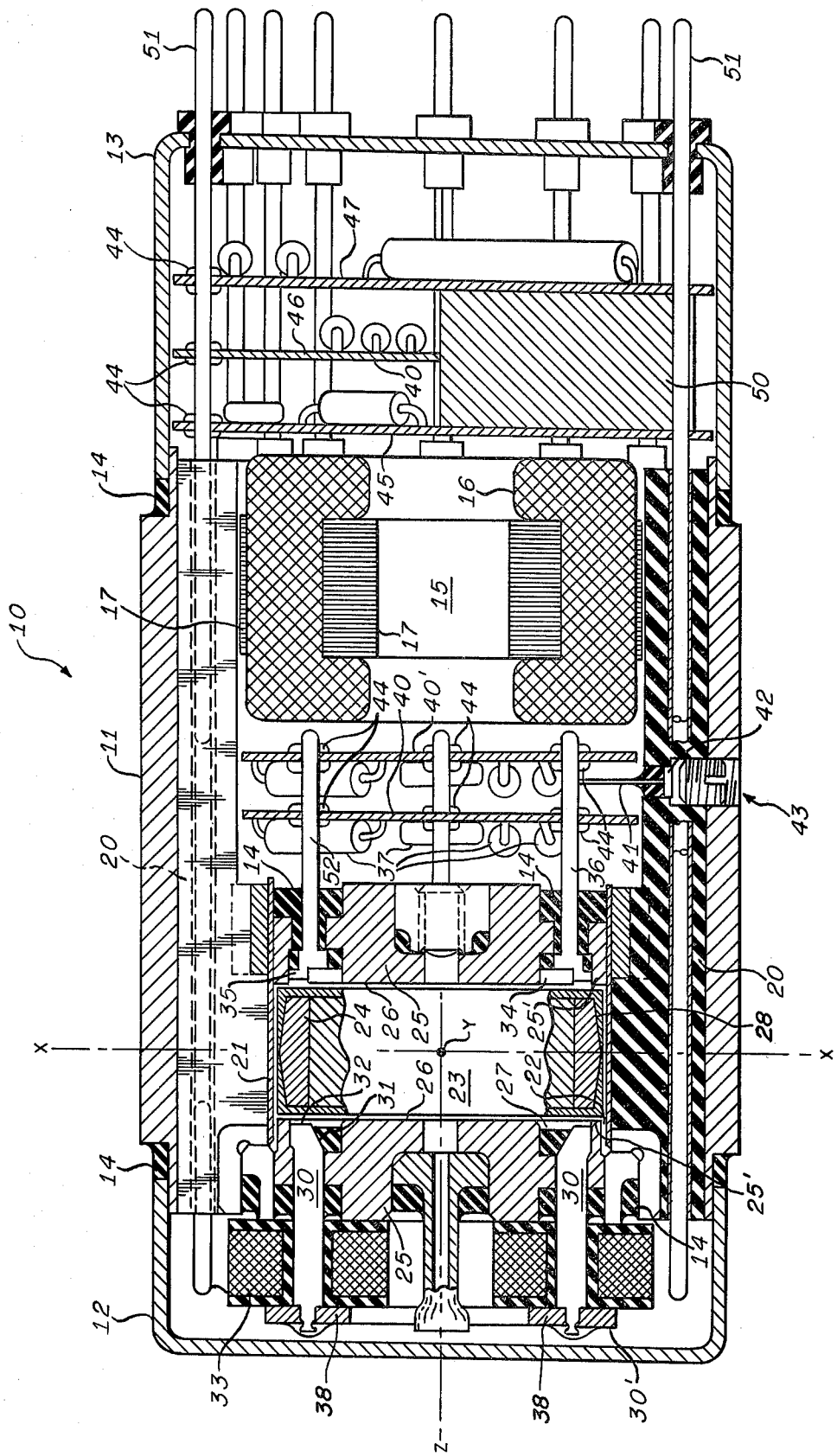
FIG. 1 is a cross-sectional view of a fluid bearing gyroscope constructed in accordance with the concepts of the present invention.

Referring to FIG. 1, the gyroscopic rate sensor 10 of the present invention comprises a cylindrical housing including a main support middle section 11 open at each end. One open end is closed by means of a suitable protective cover bell or end section 12 and the other open end is closed by means of another cover bell 13 as by epoxy 14 applied around the perimeter of the middle section 11 and the joints between the section 11 and end sections 12 and 13. A rotor drive motor stator assembly 15 formed by the combination of a coil 16 mounted on a laminated core 17 from which extends a plurality elongated laminated core pole piece extensions 20, is disposed within the middle section 11 near the end section 13. The stator core and coil assembly 15 may be a conventional hysteresis motor assembly to which the pole piece extensions 20 are mated.

Figure 2:
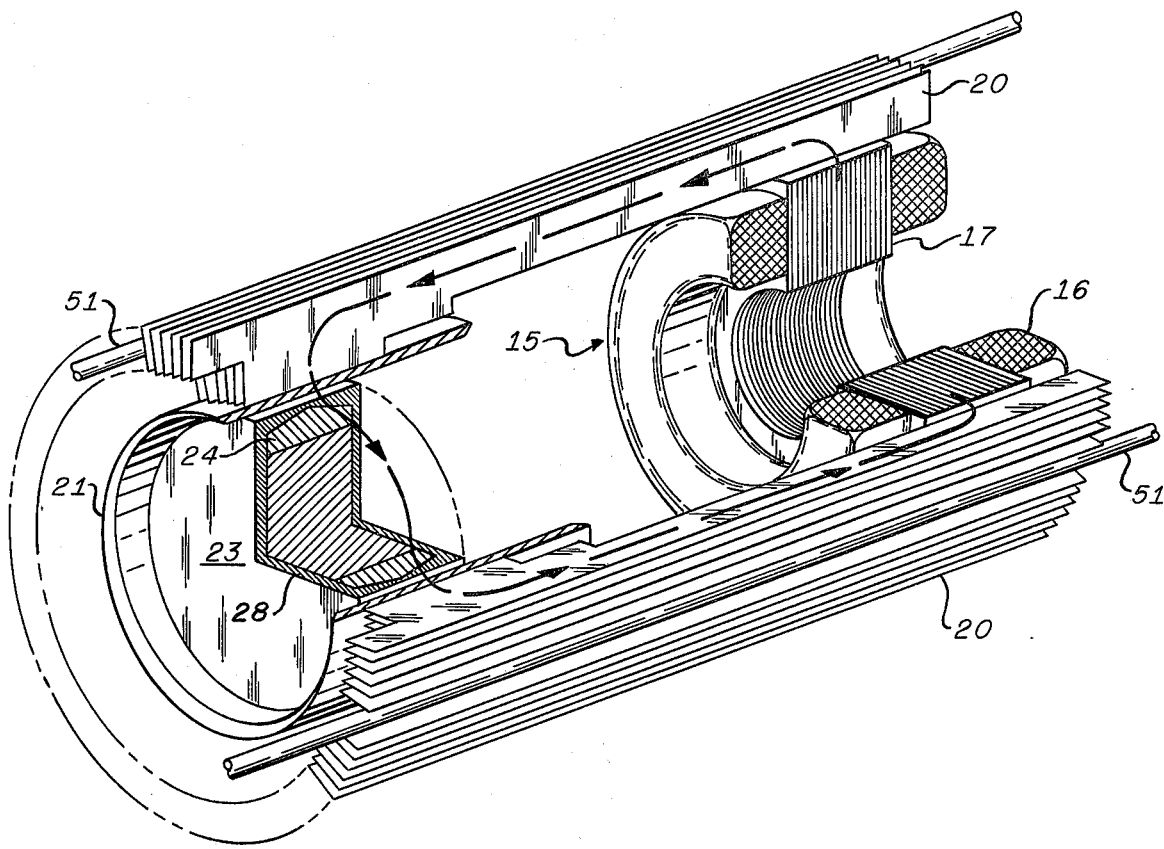
FIG. 2 is a simplified mechanical schematic diagram of the stator and rotor of the present invention and shows a typical flux path.

The plurality of bundles or stacks of elongated laminations 20 which are fabricated from conventional motor lamination material have one end of each lamination stock positioned or mated to the external pole piece laminations of the core 17. In a typical embodiment of the invention 12 equidistantly spaced bundles were used. The other end of each of the laminations 20 form a corresponding but axially remote pole to complete the motor core assembly. An inertial rotor in the shape of a thick disc 23 constitutes the rotor of the motor and is completely enclosed in a fluid tight cavity 22 formed in part by a thin cylindrical metallic sleeve or ring 21 disposed on the internal surfaces of the pole piece extensions 20 and forms a conventional saturation ring for the motor poles. The rotor 23 comprises a peripheral hysteresis ring 24 which is preferably fabricated from 18% cobalt and monel and is affixed to the perimeter of the rotor body to form a single integral unit. FIG. 2 shows a mechanical schematic of this configuration and it also depicts a typical flux path from the stator assembly through the laminations 20 to the rotor 23, it being understood that the flux rotates about the spin axis in conventional hysteresis motor fashion.

The formation of the balance of the internal sealed cavity 22 is accomplished by a pair of axially opposed thrust bearing pads 25 which have precision lapped flat parallel surfaces 26 that are preferably fabricated from hard ceramic material within the hardness range of sapphire. The bearing surfaces 26 are precisely aligned within the ring 21 so that their surfaces are parallel and spaced for proper gap dimensions and epoxy 14 is used to secure the thrust pads 25 and ring 21 in fixed relation thereby completing the internal cavity for the rotor 23.

In some applications it may be desired or required to apply controllable torques to the rotor. For this purpose the left bearing pad 25 as viewed in FIG. 1 has four bores 27 therein which accommodate four torquer pole pieces 30, each of which has a beveled surface 31 for directing the eddy-current into the rotor 23, and a flat surface 32 parallel to the thrust bearing surfaces 26. A torquer coil 33 is mounted on the end opposite the beveled surface 31 on each of the pole pieces 30. Suitable flux return path pieces are provided but not visible in FIG. 1. A further flux return path ring 30' is also provided. The four pole pieces 30 comprise two pairs of torquer poles. The first pair 38, shown in FIG. 1 is aligned along the X axis and the second pair 39, not shown, is aligned along the Y axis. Each pair is disposed in mutually perpendicular planes and when excited, for example for self test purposes, introduce a fixed differential magnetomotive force about a diametrical axis to provide torques about said diametrical axis of the rotor 23.

The other bearing pad 25 toward the right as viewed in FIG. 1 also has four apertures 34 therein for accommodating four conductor plates which form two pairs of capacitive plates 35, 35' disposed in mutually perpendicular planes. Each pair of plates 35, 35' coacts with the rotor 23 which constitutes a common conductive plate to form two pairs of capacitive pick-offs for sensing angular displacement of the rotor 23 in response to sensor turning rates about mutually perpendicular axes. The four capacitive plates are formed on the ends of pins 36 which constitute conductors from the pick-offs to associated electronic circuit components 37 mounted on a pair of printed circuit boards 40 and 40' which are likewise mechanically supported by the pins 36. Also coupled to the pins 36 through conductors 41 are trim capacitors 42 which provide individual scale factor adjustments for each capacitive plate and are conviently adjustable by means of the adjusting screws 43. The pins 36 are electrically connected to the circuit boards 40 and 40' through a plurality of solder pads 44.

The torquer pole pieces 30, the capacitive plates 35, 35' and the conducting pins 36 are cemented within the respective bearing pads 25 with the epoxy 14 after being precisely aligned and spaced to the required tolerances.

Three further electronics printed circuit boards 45, 46 and 47 are disposed within the right hand end section 13 and include an oscillator 50 which provides a high frequency alternating drive signal for the capacitive pick-offs 35, 35'. A plurality of variable length connecting rods 51 disposed perimetrically around the sensor unit 10 extend lengthwise between the bundles of laminations extensions 20 to provide means for mechanically supporting and electrically inter-connecting the various circuits of electronic boards 45, 46 and 47. The pins or rods 51 also serve as means for coupling input power signals into the sensor and for coupling output signals from the capacitive pick-offs 35, 35'. The rods 51 may be electrically connected to the boards 45, 46 and 47 where required through a plurality of plated through holes 44 on each of the boards, the electrical connections being conveniently made simply by the application of heat to the ends of the rods 51 after assembly.

This configuration is particularly suited for economical and efficient assembly and maintenance. As can be readily appreciated, if the stator assembly 15, which is usually the element of the gyro motor requiring replacement, is necessary the lower end cap or cover section 13 may be slipped off the rods 51 by removing epoxy 14 from the sealing joint. By simply applying heat to the ends of the rods 51, the electronic boards 45, 46 and 47 may be slipped off the rods 51. The stator assembly 15 which is press fitted into the inner surface of the elongated laminations 20, may be then simply removed, reworked and replaced or a new stator assembly may be inserted. The electronic boards 45, 46 and 47 are then slipped back over the rods 51 and resoldered and the end cover section 13 replaced and re-epoxied.

Figure 3:
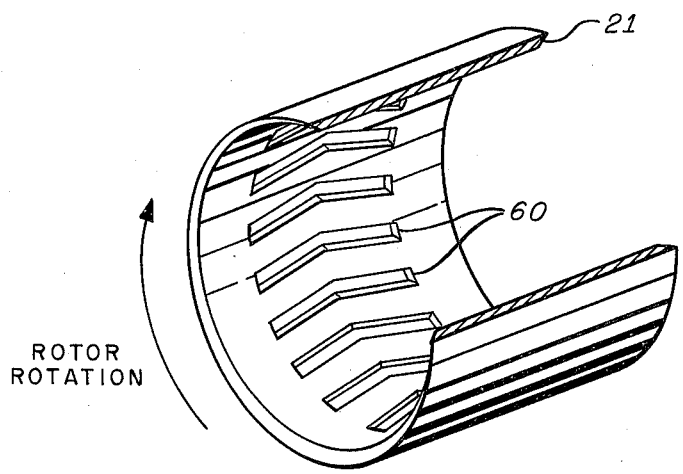
FIG. 3 is a perspective view partially in section of a cylindrical ring including profiled grooves used in the radial gas bearing for the rotor of the sensor of the present invention.

Referring now to FIG. 3, the metallic ring 21 which forms the radial support gas bearing surface for the internal cavity 22 includes a plurality of herringbone or chevron-shaped grooves 60 profiled on its inner surface by known photo-etch techniques. If profile grooving on either the cylindrical surface of the rotor 23 or the inner cylindrical surface of the metallic ring 21 is not employed a dynamic instability of the rotor 23 for all axis orientations may develop during operation of the sensor unit 10. Furthermore, it has been found that profiling herringbone or chevronshaped grooves on the cylindrical surface of the rotor 23 while increasing the dynamic stability, produces an undesirable microwobble angle due to limitations of manufacturing tolerances in producing perfect grooves on the rotor 23. As a result, during operation the rotor 23 tends to lock on to some small gap that rotates at the speed of the rotor 23 and produces a specific null tilt producing a net null output of the sensor in accordance therewith. Since the grooving may not be exactly the same at each location of the rotor 23 due to the aforesaid manufacturing tolerances, when the sensor 10 is turned off and turned back on, the rotor 23 may seek a different small gap which produces a different null tilt and provides a different null output signal. Thus the null output of the sensor 10 from turn-on to turn-on is random and therefore uncompensatable.

By placing the herringbone or chevron-shaped grooving 60 on the inner cylindrical surface of the metallic ring 21 instead of on the rotor surface the above microwobble and null shift problem is completely eliminated. Although the manufacturing tolerances may still exist when the grooves are formed on the inner cylindrical surface of the ring 21, it is believed that the rotor 23 sweeps out the small gap relative to the grooving 60 and integrates out any effects of minute imperfections in the grooving 60.

As stated above, in many applications of the rate sensor of the present invention it may be desired to provide an input rate command function, for example for preflight or in flight testing purposes, for commanding a rate maneuver, or for providing a closed loop or force feedback capability. As in the abovementioned U.S. Pat. No. 3,722,297, solenoid type torquers may be employed for this purpose since there is no intermediate gimbal structure. The torquer poles 30 and coils 33 operate on a differential solenoid principle, the rotor hysteresis ring 24 of rotor 23 acting as the torquer armature. The ring 24 is fabricated from a material having negligible conductivity, such as 18% cobalt and monel, to thereby reduce eddy current effects. Furthermore, the shaping of the pole pieces at 31 and 32 serve to concentrate the magnetic flux into the hysteresis ring 24 which permits a larger gap and in turn reduces the attraction forces which occur during rotor starting and makes starting easier.

The capacitive pick-offs 35, 35' are paired across mutually perpendicular axes so that each pair of pick-off plates 35, 35' serve to detect or sense the differential axial motions of the hysteresis ring 24 of rotor 23. Since input rates result in an angular displacement of the rotor 23 about a diametrical axis normal to the input rate axis, each pair of plates 35, 35' is positioned in a plane including an input rate axis and the spin axis. The high frequency excitation source 50 developes an alternating current charge voltage on the hysteresis ring 24 through the two plates of each pick-off relative to the frame of the sensor 10, i.e., middle section 11, through the cylindrical ring 21 and motor lamination extensions 20.

This may be better understood by considering the cylindrical ring 21 which encircles the rotor 23 and hysteresis ring 24 as a first plate on a capacitor. Applying a potential to the cylindrical ring 21 creates a differential voltage with respect to the hysteresis ring 24. The capacitor formed by the hysteresis ring 24 and the cylindrical ring 21 is a fixed capacitance that is approximately two orders of magnitude greater than the capacitance between the hysteresis ring 24 and each of the capacitive pick-off plates. It can be seen from this configuration that the hysteresis ring 24 serves simultaneously as the second plate in a first capacitor relative to the cylindrical ring 21 and as the second plate in a second capacitor relative to each of the capacitive pick-off plates. Ideally the rotor 23 would not displace along the spin axis but would merely be angularly displaced about the mutually perpendicular axes which are perpendicular to the spin axis. However, in actual operation, the rotor 23 is displaced along the spin axis, for example, in response to accelerations along the spin axis. The scale factors of each pair of capacitive pick-off plates 35, 35' must therefore be adjusted to compensate for the axial movement of the rotor 23 along the spin axis. This is accomplished by varying the leakage capacitance with respect to ground, i.e., the sensor frame 11.

The leakage capacitance to ground is varied for each capacitive pick-off plate by varying the capacitance of the trim capacitor 42 which is accomplished by means of its associated adjusting screw 40. The two scale factors in each pair of capacitive pick-off plates 35, 35' are matched to compensate for displacement of the rotor 23 along the spin axis so that the net output due to the axial displacement of the rotor 23 is acceptably small. Thus, a significant reduction of the null acceleration sensitivity along the spin axis of the rotor 23 is obtained while the cross axis alignment is substantially improved. In one specific embodiment the null sensitivity was improved from 18 degrees/second/g to 0.10 degrees/second/g with the addition of the trim capacitors 42 to each capacitive pick-off plate.

Since the rotor of the gyroscopic rate sensor 10 of the present invention is a completely freely suspended mass, it can also sense spin axis, i.e., Z axis in FIG. 1, accelerations in addition to angular rates with respect to the two mutually perpendicular axes, i.e., X and Y axes in FIG. 1. This is accomplished within the pick-off circuitry which will be described below in connection with FIG. 4.

Figure 4:
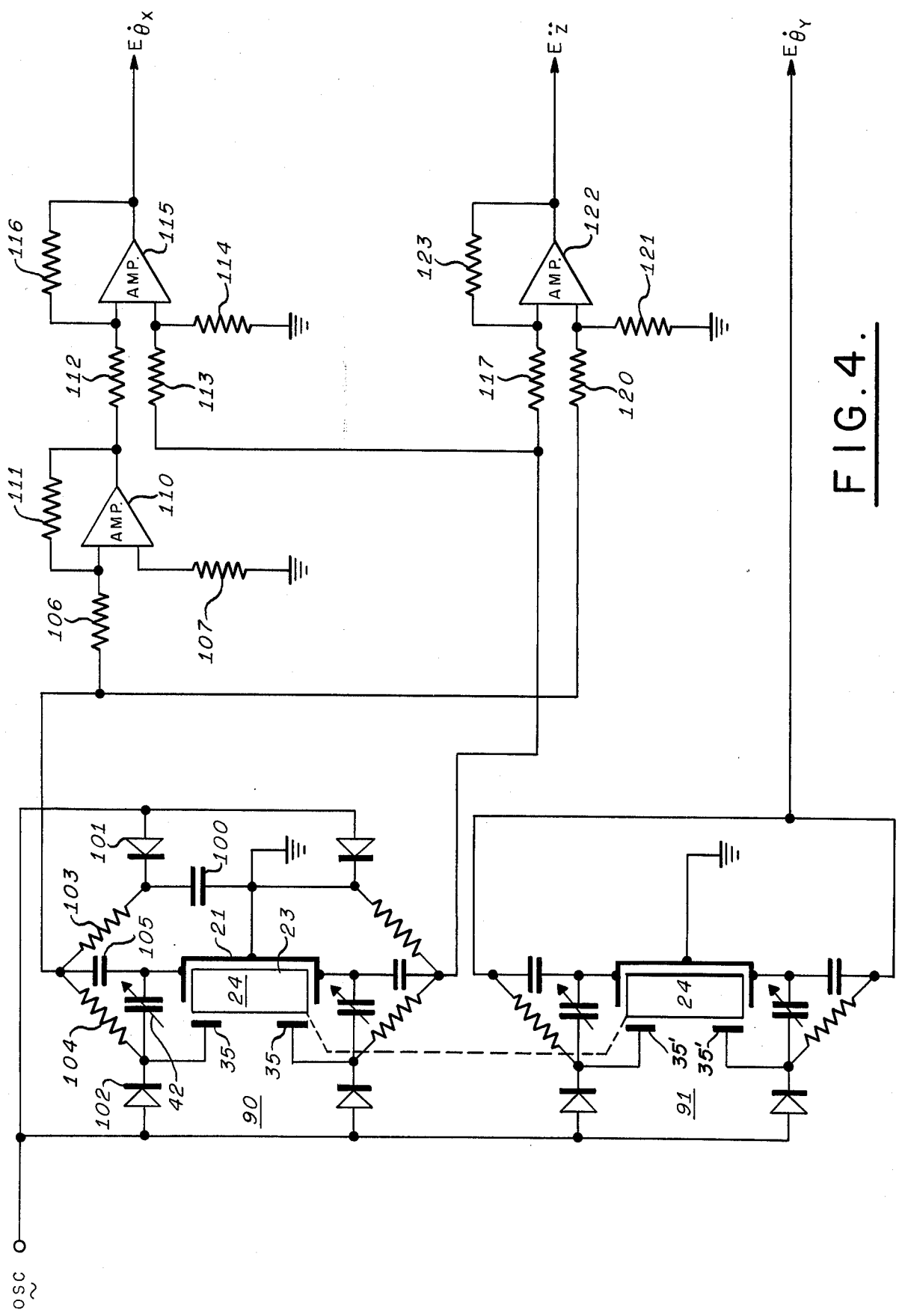
FIG. 4 is an electrical schematic diagram of circuits used in the present invention to provide electrical output signals representative of angular rates of the sensor with respect to two axes and linear acceleration of the rotor with respect to the rotor spin axis.

FIG. 4 shows a schematic diagram of the electronic circutis for providing the two angular rates and linear acceleration output signals of the sensor of the present invention. Basically the circuits comprise double or full wave rectifying bridges 90 and 91 coupled with each capacitive pick-off pair 35 and 35' respectively. The variable capacitors 35, 35' represent the variable capacity between the pairs of pick-off plates 35, 35' and the hysteresis ring 24 of the rotor 23. As indicated in FIG. 4, the first two variable capacitors 35 represent the pair of capacitive pick-off plates 35 which sense angular precession of the rotor in response to input rates about the X axis, and the other two variable capacitors 35' sense angular rates about the Y axis. The bridge circuit associated with the first capacitive pick-off plates is utilized to derive both "X" axis rate and "Z" axis acceleration and will now be described.

A fixed capacitor 100 is coupled between the case ground 21 and a first input terminal of the rectifying bridge circuit comprised of the junction of diode 101 and resistor 103. The input from the terminal on one of the variable capacitors 35 comprised of the plate and the rotor hysteresis ring 24 is coupled to the second input terminal of the rectifying bridge comprised of the junction between diode 102, variable trim capacitor 42 and resistor 104. The first output terminal of the bridge circuit comprised of the junction of resistors 103 and 104 is coupled through a capacitor 105 to ground to shunt the high frequency oscillator signal. The d.c. output signal is coupled through an input resistor 106 to the inverting terminal of an operational amplifier 110 and is also coupled through an input resistor 120 to the non-inverting input terminal on a second operational amplifier 122. The non-inverting input terminal on operational amplifier 110 is coupled to ground through a resistor 107. The output terminal of the operational amplifier 110 has a feedback connection through a resistor 111 to the inverting input terminal. The output terminal from the first operational amplifier 110 is also coupled through an input resistor 112 to the inverting input terminal of a third operational amplifier 115. The output terminal from the other half of the rectifying bridge circuit 90, which is identical to the upper half, and coupled to the second variable capacitor 35 of the X axis pick-off, is coupled through a second input resistor 113 to the non-inverting input terminal of the third operational amplifier 115. The output terminal from the upper half of the rectifying bridge 90 is also coupled through an input resistor 117 to the inverting input terminal on the second operational amplifier 122. The non-inverting input terminal on the third operational amplifier 115 is also coupled to ground through resistor 114 to provide an input bias. The output terminal of operational amplifier 115 has a feedback path through a resistor 116 to its inverting input terminal. The output signal from the operational amplifier 115 represents the algebraic summation of the output signals from the rectifying bridge circuit 90 coupled to the pair of variable capacitors 35 associated with the X axis rate sensing. Thus, the output voltage signal from the operational amplifier 115 is proportional to or a measure of the angular rate of the sensor about the X axis.

The non-inverting input terminal of the second operational amplifier 122 is coupled to ground through a resistor 121 to provide an input bias. The output terminal of operational amplifier 122 has a feedback connection through a resistor 123 to its inverting input terminal. The output signal from the operational amplifier 122 represents the algebraic difference between the output signals from the rectifying bridge circuit 90 coupled to the pair of variable capacitors 35. The operational amplifier 122 inverts the one signal and adds to the other to thereby provide an output voltage signal representative of the linear acceleration of the rotor 23 along the spin axis, i.e., the Z axis as shown in FIG. 1.

The output signals from the capacitive pick-offs 35' for sensing input rates about the Y axis are coupled through similar rectifying bridge circuit 91 and are simply summed together in a common junction to provide an output voltage signal proportional to the angular rate of the sensor about the Y axis.

A further improvement with respect to the capacitive pick-off plates of the variable capacitors 35 and 35' and the parallel face surfaces 32 of the torquer pole pieces 30 is obtained by cutting back the surfaces of the capacitive plates and the surfaces 32 below the surfaces of the thrust pads 25 and extending the ceramic pads 25 out to the edge of the rotor as at 25' to provide hard ceramic "landing strips" for the rotor in case of overrating. In other words, this improvement eliminates any possible contact between the flat edge portions of the rotor 23 and the soft metal surfaces of the capacitive pick-off plates and parallel surfaces 32 of the torquer pole pieces 30 which might occur on start-up,, shutdown or overrating.

In an earlier version of the fluid bearing gyroscope of the character disclosed in the above referenced U.S. Pat. No. 3,722,297, the flat peripheral surface of the thick, disc-shaped rotor produced a negative term in the gyro reference spring, (the latter being ideally only a function of the gas compressibility) resulting from the rotor tending to rotate about a diameter due to the magnetomotive forces in the radial gap between the hysteresis ring 24 and the cylindrical ring 21 as a minimum reluctance path was formed. In order to determine a configuration of the rotor 23 which would provide optimum performance for all angular positions of the rotor 23 within the internal cavity 22 and increase the angular rate range of the apparatus, mathematical modeling techniques were employed to determine the optimum magnetic gap between the cylindrical ring 21 and the cylindrical surface of the hysteresis ring 24. The foregoing resulted in the configuration of the rotor as shown in FIG. 1 wherein the peripheral surface of the rotor hysteresis ring 24 is gradually tapered from its center to its edges while the gas radial bearing surface is left flat by the addition of a cylindrical shaped outer coating 28 (see FIG. 1). This is accomplished by machining and plating techniques described below.

In one actual embodiment of the invention the magnetic gap between the apex of the peripheral surface on the hysteresis ring 24 and the cylindrical ring 21 measured 0.0025 inch and the gap between the cylindrical ring 21 and the edge of the peripheral surface on the hysteresis ring 24 near the axial thrust bearing surface measured 0.0085 inch.

Tests of this modified rotor 23 showed a reduction in the tendency of the rotor 23 to rotate about a diameter thereby not only improving the null stability of the sensor but also a significant extension of the angular rate range.

Most prior art gas bearing motor assemblies have a very marginal starting torque capability because the radial forces of the rotor due to rotor weight and motor magnetomotive forces produce surface pressures that result in radial frictional forces that tend to prevent the rotor from rotating. In order to overcome these high radial frictional forces some prior art devices have employed various types of lubricant agents. In time, however, these agents deteriorate and become contaminants in the supporting fluid thereby adversely effecting the life of the device. Because of the modified shape of the rotor 23, i.e., increasing the surface contact area as well as selection of an optimum ratio of magnetic/-gas-film radial gap, starting friction acting on the rotor 23 is reduced to a very low value. As a result, the ratio of the motor torque to the retarding torque due to solenoid forces is sufficiently high to assure a wide performance margin during startup even without the use of the pressure agents.

In a specific embodiment of the invention the cylindrical ring 21 was fabricated from 440 stainless steel having a thickness of approximately 0.007 inch. The gas gap between the inner surface of the cylindrical ring 21 and the outside diameter of the rotor 23 was 0.0001. The nickel cobalt hysteresis ring 24 was tapered to achieve the desired magnetic gap performance and then coated with chrome as the outer coating 28 and ground back until the chrome was 0.0025 inch thick at the cone apex of the hysteresis ring 24 to provide the desired gas bearing gap thickness. The device was subjected to tests in which more than 40,000 start/stop cycles were performed without any damage to the rotor or significant reduction in performance.

While the invention has been described in its preferred embodiment, it is to be understood that the words that have been used are words of description rather than limitation and that changes may be made within the purview of the appended claims without departing from the true scope and spirit of the invention in its broader aspects.

We claim:

1. A gyroscopic apparatus for navigable craft comprising
    housing means having a longitudinal axis and a sealed internal cavity formed therein by axial fluid thrust bearing surfaces and a cylindrical magnetic saturation ring enclosing said thrust bearing surfaces,
    rotor means having external surfaces which conform to the internal surfaces of said cavity but of slightly smaller over-all dimensions for providing a hydrodynamic bearing gap whereby upon rotation said rotor means is hydrodynamically suspended within said sealed cavity,
    stator means disposed within said housing and displaced from said sealed internal cavity along said longitudinal axis for producing a rotating magnetic field, and
    magnetic coupling means perimetrically disposed with respect to said stator means and said rotor means for providing a flux path between said stator means and said rotor means for the lines of flux in said rotating magnetic field whereby said rotor rotates about said longitudinal axis in response to said rotating magnetic field, contaminants produced by said stator means are prevented from entering said internal sealed cavity, and said stator means is removable from said housing means without disassembling said sealed internal cavity or said magnetic coupling means.

2. A gyroscopic apparatus as recited in claim 1 in which said cylindrical ring includes chevron-shaped pressure profiling grooves formed on the inner surface of said cylindrical ring adjacent the conforming cylindrical surface of said rotor means for increasing the dynamic stability of said rotor means within said cavity thereby providing a gyroscopic apparatus having improved null repeatability from turn-on to turn-on.

3. A gyroscopic apparatus as recited in claim 1 in which said axial thrust bearing surfaces include surfaces of ceramic material and said conforming surfaces on said rotor means adjacent said axial thrust bearing surfaces include surfaces of metallic materials for substantially reducing the probability of said rotor means welding to said thrust bearing surfaces during frictional contact.

4. A gyroscopic apparatus as recited in claim 1 in which said rotor means includes a thick disc-shaped rotor having a magnetically permeable cylindrical surface portion which is tapered from the middle of said cylindrical surface to the external edge surfaces thereof for providing a magnetizable rotor portion having a greater diameter across the middle of its cylindrical surface than across its edge surfaces thus shaping the magnetic flux gap between said stator means and said rotor and thereby improving the angular rate range and null stability of the apparatus.

5. A gyroscopic apparatus as recited in claim 4 in which said magnetically permeable surface portion is fabricated of 18% cobalt and monel and forms an integral part of said disc-shaped rotor.

6. A gyroscopic apparatus as recited in claim 4 in which said rotor includes an external metallic coating of non-magnetizable material covering at least said tapered surface whereby said rotor has a tapered cylindrical surface for said magnetic flux gap and a right cylindrical surface for said hydrodynamic bearing gap.

7. A gyroscopic apparatus as recited in claim 1 in which said flux coupling means includes a plurality of bundles of elongated laminated metal flux conducting plates. Separated from said stator means and said rotor means.

8. A gyroscopic apparatus as recited in claim 7 further including
    at least one electronics board having a plurality of solder pads positioned between said stator means and one end of said housing, and
    conducting rods disposed between said bundles of laminated metal plates and extending through said solder pads and beyond said one end of said housing thereby providing means for electrically connecting said board to said rods externally of said housing.

9. The gyroscopic apparatus as set forth in claim 1 wherein
    said magnetic coupling means includes a plurality of elongated pole pieces extending longitudinally of said housing,
    said stator means comprises a generally cylindrical wound stator coaxial with said housing axis and having a corresponding plurality of pole pieces for producing a rotating flux field, and
    said stator means being removably fit within said pole piece extensions at one end thereof and said sealed internal cavity being supported within the said pole piece extensions at the other end thereof.

10. The apparatus as set forth in claim 9 further including
    high frequency capacitive pick-off means in a wall of said internal cavity for detecting motion of said rotor, and
    circuit means responsive to said pick-off means including at least one circuit board positioned between said stator means and said internal cavity whereby to reduce the conductor lengths between said pick-off means and said circuit means.

11. The gyroscopic apparatus as set forth in claim 3 wherein said thrust bearing surfaces include surfaces fabricated from hard ceramic material within the hardness range of sapphire and further including capacitive pick-off means comprised of a plurality of metallic plates disposed in one of said thrust pads and symmetrically radially displaced from said spin axis, and circumferential thrust pad surfaces also fabricated from hard ceramic materials within the hardness range of sapphire extending radially beyond said pick-off plates for providing a hard landing ring for said rotor upon overrating of said apparatus whereby to minimize damage to said rotor and pick-off plates.

12. A gyroscopic apparatus as recited in claim 1 further including capacitive pick-off means comprised of plates disposed in one of said axial thrust bearing surfaces, and torquer pole means disposed in the other of said axial thrust bearing surfaces, said plates and said poles being recessed from said axial thrust bearing surfaces thereby minimizing damage to said rotor means, said plates and said poles during overrate operation of said gyroscopic apparatus.

13. A gyroscopic apparatus as recited in claim 1 which further includes a first pair of capacitive pick-off plates cooperable with said rotor for detecting precession of said rotor in response to angular rates of said housing means about a first axis, a second pair of capacitive pick-off plates cooperable with said rotor for detecting precession of said rotor in response to angular rates of said housing means about a second axis perpendicular to said first axis, a source of high frequency voltage excitation coupled between said plates and said rotor means, and said rotor means functions as a second common capacitive plate for each of said capacitive pick-off plates whereby said first and second pairs of capacitive pick-off plates provide output voltage signals in accordance with the angular rates of said housing about said first and second axes respectively.

14. A gyroscopic apparatus as recited in claim 13 which further includes a full wave rectifying bridge circuit connected to each of said capacitive pick-off plates and mounted adjacent said capacitive pick-off plates to provide output d.c. signals thereby eliminating the necessity of physically shielding said output signals from electrical signals produced by said stator means.

15. A gyroscopic apparatus as recited in claim 14 which further includes an operational amplifier coupled to said full wave rectifying bridge circuits associated with one pair of said capacitive pick-off plates for providing an output signal in accordance with the linear acceleration of said rotor means along the spin axis of said rotor means.

16. A gyroscopic apparatus as recited in claim 13 which further includes trim capacitors coupled to each of said capacitive pick-off plates thereby providing means for equalizing individual scale factors associated with each of said capacitive pick-off plates.

17. A gyroscopic apparatus as recited in claim 16 in which said trim capacitors include capacitors having adjusting means that are accessible through the walls of said housing whereby the capacitance of said capacitors may be varied without any disassembly of said gyroscopic apparatus.

18. A gyroscopic apparatus as recited in claim 1 which further includes a first pair of torquers aligned parallel to a first axis, a second pair of torquers aligned parallel to a second axis perpendicular to said first axis, a source of voltage coupled to said first and second pair of torquers and said rotor means functions as the armature of said first and second pairs of torquers whereby a fixed magnetomotive force is produced in either or both axes which is unbalanced to apply torques about a diametrical axis of said rotor means.

19. A gyroscopic apparatus as recited in claim 18 in which each torquer comprises a solenoid type torquer including a pole piece and coils perimetrically disposed with respect to said pole piece.

20. A gyroscopic apparatus as recited in claim 19 in which said torquer pole piece has a first surface parallel to said axial thrust bearing surface and a second, beveled surface adjacent said first surface whereby to concentrate the pole flux threading into said rotor means.

* * * * *